United States Patent
Ko

(10) Patent No.: US 8,879,050 B2
(45) Date of Patent: Nov. 4, 2014

(54) METHOD FOR DYNAMICALLY ADJUSTING THE OPERATING PARAMETERS OF A TOF CAMERA ACCORDING TO VEHICLE SPEED

(71) Applicant: Texas Instruments Incorporated, Dallas, TX (US)

(72) Inventor: Dong-Ik Ko, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 34 days.

(21) Appl. No.: 13/693,444

(22) Filed: Dec. 4, 2012

(65) Prior Publication Data

US 2014/0152975 A1   Jun. 5, 2014

(51) Int. Cl.
*G01C 3/06* (2006.01)
*G01S 17/89* (2006.01)

(52) U.S. Cl.
CPC .................. *G01S 17/89* (2013.01)
USPC ......... 356/5.01; 356/3.01; 356/3.1; 356/4.01; 356/4.1; 356/5.1

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | | | |
|---|---|---|---|---|
| 5,835,199 A | * | 11/1998 | Phillips et al. | 356/5.03 |
| 2005/0083512 A1 | * | 4/2005 | Stierle et al. | 356/4.01 |

* cited by examiner

*Primary Examiner* — Luke Ratcliffe
(74) *Attorney, Agent, or Firm* — Robert D. Marshall, Jr.; Frederick J. Telecky, Jr.

(57) ABSTRACT

A method for adjusting the modulating frequency and the intensity of the IR illumination of a Time of Flight measurement system proportionally to the speed of movement and the ambient light level of the TOF system, thus adjusting the range of vision of the system dependent on speed. In an alternate embodiment the modulating frequency of a TOF measurement system is periodically adjusted to cover a larger range of vision of the TOF.

4 Claims, 1 Drawing Sheet

METHOD FOR DYNAMICALLY ADJUSTING THE OPERATING PARAMETERS OF A TOF CAMERA ACCORDING TO VEHICLE SPEED

TECHNICAL FIELD OF THE INVENTION

The technical field of this invention is a Time of Flight sensor system.

BACKGROUND OF THE INVENTION

Acquiring 3D geometric information from real environments is an essential task for many applications in computer graphics. Prominent examples such as virtual and augmented environments and human machine interaction, e.g. for gaming, clearly benefit from simple and accurate devices for real-time range image acquisition. However, even for static scenes there is no low-price off-the-shelf system that provides full-range, high resolution distance information in real time. Laser triangulation techniques, which merely sample a scene row by row with a single laser device, are rather time-consuming and therefore impracticable for dynamic scenes. Stereo vision camera systems suffer from the inability to match correspondences in homogeneous object regions.

Time-of-Flight (ToF) technology, based on measuring the time that light emitted by an illumination unit requires to travel to an object and back to a detector, is used in LIDAR (Light Detection and Ranging) scanners for high-precision distance measurements. Recently, this principle has been the basis for the development of new range-sensing devices, so-called ToF cameras, which are realized in standard CMOS or CCD technology; in the context of photogrammetry, ToF cameras are also called Range Imaging (RIM) sensors. Unlike other 3D systems, the ToF camera is a very compact device which already fulfills most of the above-stated features desired for real-time distance acquisition. There are two main approaches currently employed in ToF technology. The first one utilizes modulated, incoherent light, and is based on a phase measurement. The second approach is based on an optical shutter technology, which was first used for studio cameras and was later developed for miniaturized cameras Within the last three years, the number of research activities in the context of ToF cameras has increased dramatically. While the initial research focused on more basic questions like sensor characteristics and the application of ToF cameras for the acquisition of static scenes, other application areas have recently come into focus, e.g. human machine interaction and surveillance.

A variety of safety-enhancing automobile features can be enabled by digital signal processors that can sense and analyze the dynamic 3D environment inside and outside the vehicle. Safety features may include collision warning and avoidance, smart airbag deployment, obstacle detection such as backup warning, and parking assistance. Common to these applications is the need to detect, isolate, measure, locate, recognize, and track objects such as people, traffic, and roadside features.

It is often proposed to perform these tasks using conventional 2D imaging sensors and analysis software, but achieving cost-effective and reliable performance during all vehicular usage scenarios is a formidable challenge. The appearance of objects in a 2D image varies greatly, depending on illumination conditions, surface materials, and object orientation. These variations in the image complicate the task of software that must interpret the scene. On the other hand, the 3D shape of objects is invariant to those confounding effects.

Stereovision based 3D recovery is computationally complex and fails on un-patterned surfaces. RADAR, ultrasonic, scanning LADAR, and other ranging technologies are similarly proposed, but they have difficulty discriminating objects due to limited temporal or angular resolution; moreover, the need for specialized sensors for each safety function poses system integration challenges. A single high frame rate focal-plane-array 3D sensor is desirable because it can serve multiple safety and convenience functions simultaneously, allowing applications to jointly exploit shape and appearance information in a dynamic scene. The output of the sensor should be a sequence of 2D arrays of pixel values, where each pixel value describes the brightness and Cartesian X,Y,Z coordinates of a 3D point on the surface of the scene.

Growing government legislation, increasing liability concerns, and the inevitable consumer desire for improved safety make the introduction of new safety features a high priority for automakers. Today, various sensing technologies play a key role in delivering these features, detecting conditions both inside and outside of the vehicle in applications like parking assistance, adaptive cruise control, and pre-crash collision mitigation. Each of these applications is characterized by a unique customized technology (e.g. ultrasonic, RADAR, LADAR, digital image sensing, etc.), which generally provides either a ranging function or an object recognition function.

The need for investment in multiple disparate technologies makes it challenging to deploy individual safety features as quickly or as broadly as desired.

Future applications pose even more difficulties, as multiple features must be provided in a single vehicle. Plus, virtually all of the new sensing applications on automakers' roadmaps (e.g. pedestrian detection being planned in Europe and Japan) require both ranging and object recognition functions. Combining two incongruent technologies to accomplish this task (such as RADAR and digital image sensing) is expensive, difficult to implement, and poses the additional problem of inefficient development.

The use of vision gives added levels of discernment to the air bag systems by providing static or dynamic occupant classification and position sensing. Further, the addition of a vision system inside the cabin enables other value-added applications such as abandoned baby/pet detection, personalization, and security. Applications for vision-based sensing outside the car are blind spot detection, vehicle lane departure, safety in rear vision, proximity of other vehicles around the vehicle, and off road and heavy equipment proximity sensing. The benefits of vision sensors are two fold. They provide enhanced visual feedback to assist the driver in operating the vehicle. But more importantly, when vision sensors also provide range data, they provide the necessary information for advanced algorithms to achieve higher level of discernment and more accurate analysis of object motion dynamic. With such sensors, for instance, the system can use the shape differences between a person and a large box sitting in the front seat to deploy the air bag or not.

In addition to depth values, ToF cameras also provide intensity values, representing the amount of light sent back from a specific point.

Due to the periodicity of the modulation signal, ToF cameras have a defined non-ambiguous range. Within this range, distances can be computed uniquely. The range depends on the modulation frequency of the camera which defines the wave length of the emitted signal. As shown in FIG. 1, to compute distances the camera evaluates the phase shift between a reference (emitted) signal 101 and the received signal 102. The phase shift is proportional to the distance d.

Currently most ToF cameras operate at a modulation frequency of about 20 MHz for gaming, TV control gesture and digital signage etc. Then, a single wavelength is 15 meter, and the unique range of these ToF cameras is approx. 7.5 meter. This frequency may be changed for automotive use where a car moves at 60 miles per hour or faster to obtain a longer range coverage. The range can be adjusted by adjusting the modulation frequency of the active illumination depending on automobile's speed.

SUMMARY OF THE INVENTION

Depth sensor technology is a cutting edge new technology. The TOF sensor's cross-interference from modulated illumination has not been considered mainly because multiple TOF cameras have not been adopted to any great degree. As a result, TOF modulation frequencies have been manually reconfigured. However, for example, if TOF technology is widely applied to automobile applications e.g. for front and rear scene analysis, it is almost impossible to assign individually separate TOF modulation frequencies for each sensor product. The given technique allows a dynamic change of TOF modulation frequency by detecting other TOF sensors' modulation frequencies. Thus, the cross-interference of modulated illumination among multiple TOF sensors can be avoided.

Additional functions are enabled by the capability of dynamically changing the IR modulating frequency. By adjusting the modulation frequency in relation to the vehicle's speed, the range of the TOF camera can be optimized for collision avoidance or speed control application. At higher speeds the camera's range is extended to allow more time for speed adjustment, and at slower speeds the range is reduced with a corresponding increase of the distance measurement's accuracy.

IR illumination power may also be dynamically adjusted according to speed and ambient light in order to minimize the noise level seen by the TOF.

BRIEF DESCRIPTION OF THE DRAWINGS

These and other aspects of this invention are illustrated in the drawings, in which.

DETAILED DESCRIPTION OF PREFERRED EMBODIMENTS

A TOF (Time Of Flight) sensor delivers a very accurate depth measurement and can be widely applied to applications within various environments. However, TOF sensor technology intrinsically has a cross interference problem among TOF sensors due to IR illuminations from multiple TOF sensors employing the same modulation frequency. Since IR modulation frequency is directly related to a covered depth range of TOF, there is the likelihood that the same modulation frequency of TOF IR illumination will be selected among TOF sensors in place.

For example, for applications targeting a mid range depth map, in many cases a 20 MHz IR modulation frequency is chosen. Interference from TOF sensors with the same IR modulation frequency (20 MHz) can significantly impact on depth accuracy of each sensor.

The described invention provides a method to avoid IR interference among TOF sensors by combining the IR modulation frequency detector with logic for dynamic adjustment of the IR transmission modulation frequency.

Figure 1:
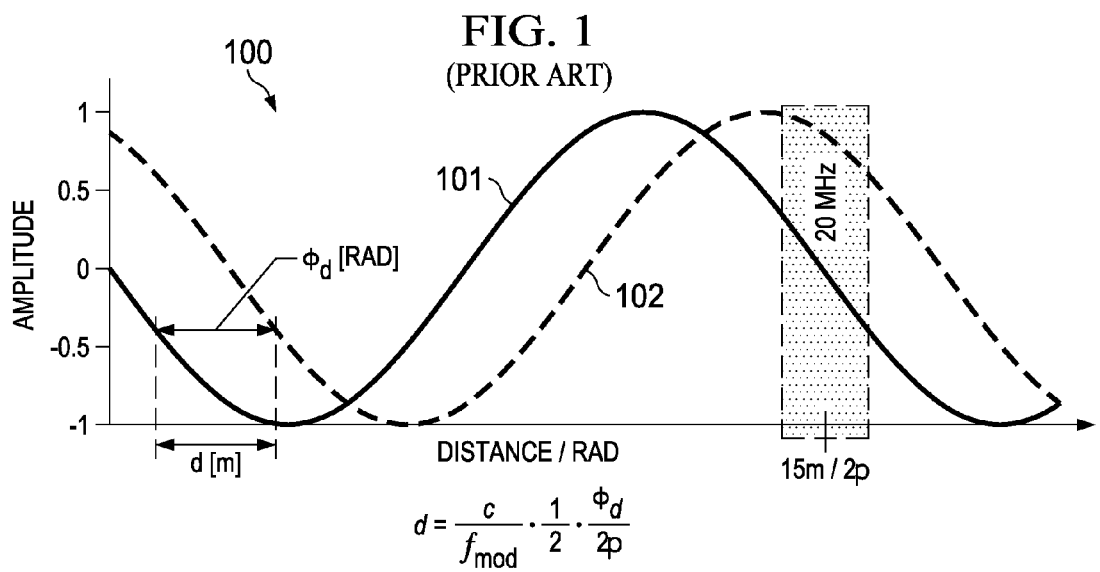
FIG. 1 shows the prior art TOF distance measurement.
Figure 2:
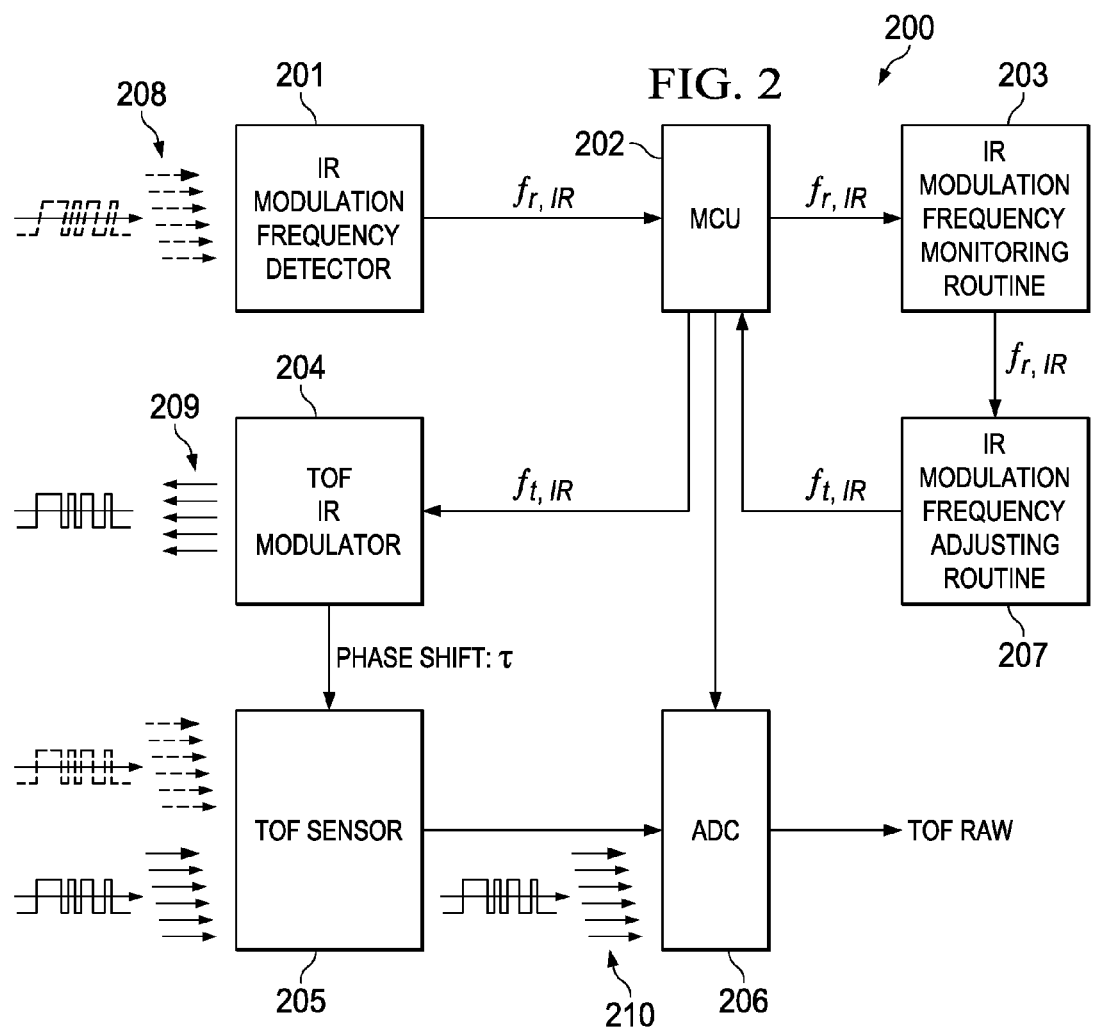
FIG. 2 illustrates the block diagram of the present invention.

As shown in FIG. 2, the invention consists of mainly two parts, the AIMD (Ambient IR Modulation-frequency Detection) module and TIMA (Transmission IR Modulation-frequency Adjustment) module.

The AIMD module detects all ambient IR modulation-frequencies 208 by IR frequency detector 201, and MCU 202 analyzes each modulation frequency and its duration time by IR Modulation Frequency Monitoring Routine 203. If its duration $\Delta time(f_{r,IR})$ is longer than a predefined threshold $Th_{\Delta time}$, the MCU triggers IR Modulation Frequency Adjusting Routine 207 to adjust the current IR transmission modulation frequency 209 of the associated TOF sensor. The predefined threshold can be dynamically re-configured to adjust the sensitivity of TOF to interference noise and the requirement for real-time processing.

A minor change of IR modulation frequency 209 (e.g. 20 Mh->20.1 Mhz) can significantly reduce the interference related noise. Thus, the interference of ambient IR modulation frequencies can be removed in the depth map acquisition of TOF sensor 205. As a result, TOF sensor raw data 210 can be captured without ambient cross-interference noise.

A different embodiment of the invention, in addition to reducing interference from ambient IR modulation frequencies adds the capability of adjusting the IR modulation frequency and the IR illumination intensity of the TOF camera according to the velocity of the vehicle, and the intensity of the ambient light. In collision prevention or other speed sensitive application, it is beneficial to increase the vision distance of the TOF camera as vehicle speed increases in order to ensure adequate time for corrective action.

A still different embodiment of the invention, in addition to reducing interference from ambient IR modulation frequencies adds the capability of periodically varying the modulation frequency, and therefore the vision distance of the TOF camera to effectively cover a larger vision map.

What is claimed is:

1. A method of adjusting the operating parameters of a Time of Flight (TOF) measurement system comprising the steps of:
    receiving a signal indicating the speed of movement of the TOF measurement system;
    reducing the modulation frequency of the TOF measurement system proportionally to the increase of the speed of movement of the TOF measurement system;
    increasing the intensity of the IR illumination level proportionally to the increase of the speed of movement of the TOF measurement system;
    receiving a signal indicating the level of ambient light;
    adjusting the IR illumination level inversely proportionally to the level of the ambient light.

2. The method of claim 1 wherein:
    the signal indicating the speed of movement of the TOF measurement system is a continuously variable signal proportional to the speed.

3. The method of claim 1 wherein:
    the signal indicating the speed of movement of the TOF measurement system is a step function proportional to set speed ranges.

4. The method of claim 1 further comprising the steps of:
    periodically varying the modulation frequency of the TOF measurement system without considering the speed.

* * * * *